March 2, 1943.    F. R. BALCAR    2,312,952
METHOD OF PRODUCING CHLORINE
Filed April 26, 1941
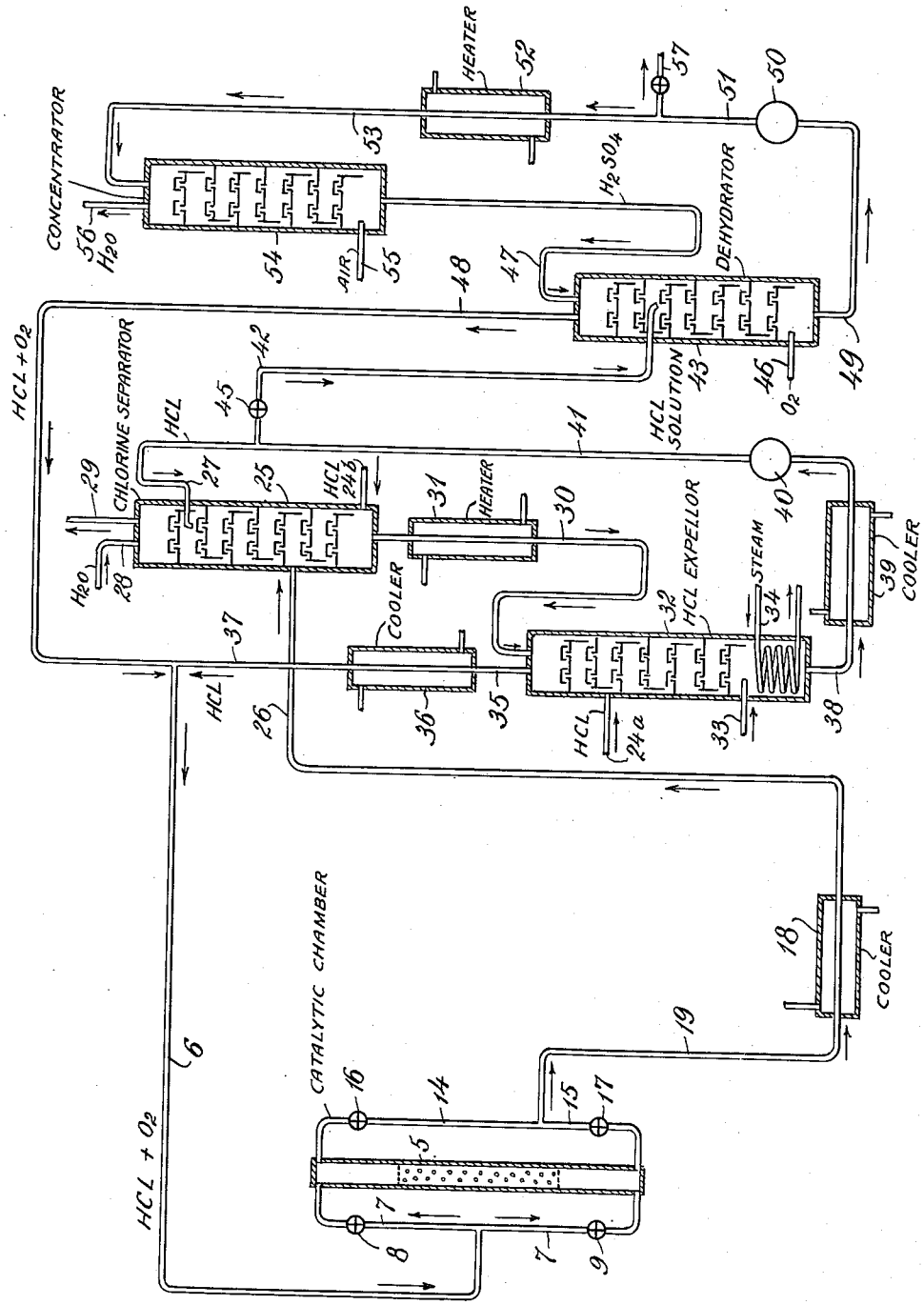
INVENTOR
Frederick R. Balcar
BY
Pennie Davis Marvin & Edmonds
ATTORNEYS Patented Mar. 2, 1943

2,312,952

UNITED STATES PATENT OFFICE 2,312,952

METHOD OF PRODUCING CHLORINE

Frederick R. Balcar, Stamford, Conn., assignor to Air Reduction Company, Incorporated, New York, N. Y., a corporation of New York Application April 26, 1941, Serial No. 390,577

4 Claims. (Cl. 23—219)

This invention relates to the preparation of free chlorine from hydrogen chloride and particularly to improvements in the method of oxidizing hydrogen chloride, controlling the reaction and maintaining a continuous and cyclic operation to avoid losses and insure maximum recovery of the desired product.

The reaction involving the oxidation of hydrogen chloride has long been known and was utilized in the so-called "Deacon process." This process however, even with improvements, has never been satisfactory for the commercial production of chlorine. In fact, for many years practically all commercial chlorine has been obtained principally by electrolysis of salt solutions such as aqueous solutions of sodium or potassium chloride. While the electrolytic process is successful and will produce chlorine at reasonable costs, it has the disadvantage that caustic soda or potash are unavoidable by-products. Where there is little or no use for caustic soda or potash, the electrolytic process cannot be operated advantageously.

In Patent No. 2,204,172 issued June 11, 1940, I have described an effective and economical method of oxidizing hydrogen chloride to produce chlorine. This method is particularly suitable for use in locations where salt and sulphuric acid are readily available or where hydrogen chloride is obtained as a by-product of a chlorination reaction such as the chlorination of hydrocarbons or hydrocarbon derivatives.

Hydrogen chloride obtained by the reaction of a salt and sulphuric acid usually contains some sulphur compounds, for example sulphur dioxide, which if passed over the oxidation catalyst may act as poisons and partially or completely suppress the oxidation reaction. Hydrogen chloride from other sources may contain other poisons which, if allowed to come into contact with the catalyst, will reduce its efficiency or render it useless. Thus, if the gas entering the reactor in the method described in Patent No. 2,204,172 contains a relatively small proportion of sulphur dioxide, the effect may be exceedingly detrimental, so that after a short period of time the catalyst may lose a substantial fraction of its normal activity.

It is the object of the present invention to provide a simple and effective method whereby contaminating impurities can be removed effectively from hydrogen chloride supplied to the reaction so that the catalyst may be employed for long periods without reduction of efficiency due to catalyst poisons.

Another object of the invention is to avoid returning chlorine with the hydrogen chloride in the cycle, thereby preventing the undesirable result of the law of mass action which tends to reduce the amount of new chlorine formed in the reaction.

Another object of the invention is the provision of a simple and effective method of oxidizing hydrogen chloride to produce chlorine in which high efficiency can be maintained through the elimination of undesirable elements in the system and particularly deterioration of the catalyst under the influence of such elements.

Other objects and advantages of the invention will be apparent as it is better understood by reference to the following specification and accompanying drawing, which illustrates diagrammatically the various essential parts of the apparatus, it being understood that details which form no part of the invention are omitted for the purpose of clarity.

In carrying out the invention, I employ a catalyst disposed in a suitable chamber to which a mixture of hydrogen chloride and oxygen in proportions determined as hereinafter described is fed uniformly. As a catalyst I prefer to employ the composition described in the patent to Hoke S. Miller, No. 2,204,733 issued June 18, 1940. As described in that patent, the catalyst consists of a compound of copper to which has been added a compound of one or more of the group of metals commonly known as the rare earth group, or a compound of uranium. By "rare earth group," I mean the metals commonly known as rare earth metals and including the following: scandium, cerium, lanthanum, praseodymium, neodymium, illinium, samarium, thorium, europium, gadolinium, terbium, yttrium, dysprosium, holmium, erbium, thulium, ytterbium, lutecium and zirconium.

The rare earth material may be added to the copper compound as a pure material, or it may be added as a mixture of rare earth compounds. For example, a compound of thorium or lanthanum may be added to the copper compound, or a mixture of cerium and thorium compounds may be used advantageously. In general, I prefer to use a mixture of rare earth compounds and associated materials ordinarily obtained from monazite sand, samarskite and other minerals, or the mixture of these materials remaining after the commercial extraction of one or more of the components such as thorium or cerium.

The composition of the catalytic material may be varied within rather wide limits. Good results may be obtained when the amount of copper compound present is such that the catalyst contains a fraction of 1% by weight of copper, or the copper content of the catalyst may be increased to 25% by weight or more. The amount of rare earth material added may be varied from a fraction of 1% by weight to 90% by weight or more if desired.

In general I prefer to use 1 to 5% by weight of copper and 10 to 60% by weight of one or more of the rare earth materials previously described. I prefer to impregnate a suitable support, such as pumice, silica gel, diatomaceous earth, fire clay and the like, with a mixture of the copper compound and the rare earth compounds, although a supporting material is not absolutely necessary.

While the preferred catalyst is a compound such as I have described, such a catalyst is not essential to the operation of the method. I may employ a suitable copper compound such as copper chloride or any other catalyst which is capable of effecting the desired reaction. Copper chloride is known to be a catalyst for the desired reaction and was originally suggested as the catalyst for the Deacon process. The method as hereinafter described permits the utilization of such a catalyst without the disadvantages and losses which were incidental to the Deacon process.

The catalyst may be prepared in a variety of ways such as by precipitation of the metals as the hydroxides on a suitable supporting material such as pumice, silica gel, diatomaceous earth, fire clay or other porous material which will withstand the effect of elevated temperatures and exposure to chlorine, hydrogen chloride, oxygen and steam. An alternative method is to soak the supporting material in a solution of salts of the appropriate metals, for example, the chlorides, sulphates or nitrates of the metals, with subsequent addition, with stirring, of water, or a solution of ammonia, sodium or potassium hydroxides, or other alkaline solution, after which the resulting mixture is dried and heated to the reaction temperature before use.

The catalyst may be prepared also by precipitating the metals as hydroxides with sodium or potassium hydroxide as the precipitating agent, or the oxides or other materials desired as the catalyst may be thoroughly mixed and pressed into pellets for use.

The selected catalyst as thus prepared is disposed in a suitable chamber 5. The chamber may be constructed of any suitable material resistant to the corrosive effect of the vapors and the temperature attained. The mixture of hydrogen chloride and oxygen in the proportions hereinafter described is introduced to either end of the chamber 5 through pipe 6 having branches 7. Valves 8 and 9 permit direction of the entering gas mixture to the opposite ends of the catalyst chamber to permit reversal of the flow for the purpose hereinafter more fully explained. The resulting products of reaction escape through pipes 14 or 15 controlled by valves 16 and 17 depending upon the direction of flow of the gaseous mixture through the catalyst body.

Copper chloride volatilizes at the temperature of the reaction and will escape from that portion of the catalyst where the temperature is highest and will be condensed in another portion of the catalyst. Upon reversal of the operation, the same result will follow and the copper compound will again be condensed and none of the copper will be permitted to leave the catalyst body.

The products of reaction are delivered to a cooler 18 through a pipe 19 and thence through a pipe 26 to the chlorine separator 25, the function of which is hereinafter more fully described. A portion of the hydrogen chloride and oxygen forming the gaseous mixture which enters the reaction chamber is a product of separations effected in the manner hereinafter described. Additional hydrogen chloride in the gaseous mixture formed is introduced through a pipe 24a, as hereinafter described.

The desired control of the operation is obtained by regulating the proportions of hydrogen chloride and oxygen in the mixture. If the proportions indicated by stoichiometric relations as shown by the reaction equation

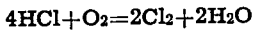

$$4HCl + O_2 = 2Cl_2 + 2H_2O$$

were employed, the temperature attained by the reaction would be much too high. Consequently the proportions are such as to ensure a temperature of from about 425 to 600° C. as a maximum. While I prefer to operate with a reaction temperature in the vicinity of 425 to 600° C., I have obtained good results at temperatures as low as 300 to 350° C., and also at temperatures as high as 600 to 800° C., and higher. The temperature control may be accomplished by using either an excess of hydrogen chloride or an excess of oxygen. The former relation is preferred where pure chlorine is desired. The latter relation produces chlorine diluted with oxygen which may be desirable in certain cases where the chlorine can be utilized in this form and the oxygen recovered for reuse. The preferred proportions are thus illustrated in terms of flow, for example, 40 cu. ft. per hour of hydrogen chloride used to 3 cu. ft. of oxygen per hour. Alternatively, it would be practical to employ 30 cu. ft. of oxygen and approximately 12 cu. ft. per hour of hydrogen chloride. It will be understood that these ratios are not fixed but are those well adapted to result in the desired reaction temperature in the catalyst body. The ratios may be varied within relatively wide limits but, to avoid excessive temperatures, the reaction is best conducted with ratios other than that indicated by stoichiometric proportions.

Having effected the reaction to produce chlorine, the next step in the operation involves the separation of the chlorine from unreacted hydrogen chloride and water vapor resulting from the oxidation of hydrogen in the reaction chamber. For this purpose, I provide an absorber 25 consisting of a tower containing suitable trays or rings or other means to insure adequate contact of the vapors with the liquid supplied for absorption. The gaseous mixture is introduced near the bottom of the tower through pipe 26. Near the top of the tower a solution of approximately 25% hydrochloric acid is introduced through a pipe 27. A small amount of water as reflux may be introduced through a pipe 28 at the top of the tower. The liquids descending through the tower extract substantially all of the hydrogen chloride remaining in the gaseous mixture, and chlorine in substantially pure condition escapes through pipe 29. In the event that there is an excess of oxygen in the system, oxygen will also escape with the chlorine through the pipe 29. It is possible also to employ air as the oxidizing agent in place of oxygen, in which event nitrogen will appear as a contaminating agent in the chlorine produced and any nitrogen will also escape through the pipe 29 with the chlorine. For many purposes chlorine diluted with nitrogen may be utilized and the reaction may be conducted with air as the oxidizing agent at somewhat less expense than where oxygen must be supplied.

The hydrogen chloride from the tower 25 escapes through a pipe 30 which may be provided with a heater 31 supplied with steam or other suitable heating agent to raise the temperature of the liquid. The pipe 30 delivers the hydrogen chloride to an expeller 32 consisting of a tower with trays, rings or other means to effect adequate contact of the liquid with oxygen supplied at the bottom of the tower through a pipe 33. A heating coil 34 supplied with steam or other suitable heating agent is disposed in the bottom of the tower to raise the temperature of the liquid. In travelling through the tower, the hydrogen chloride is released from the liquid and escapes through a pipe 35 into a reflux cooler 36 which condenses substantially all the water present in the vapor. Thus the hydrogen chloride with the oxygen supplied through the pipe 33 is delivered through the pipe 37 to the inlet pipe 6. The weak hydrogen chloride solution descending through the tower 32 escapes through a pipe 38, passes through a cooler 39 and is delivered by a pump 40 through pipes 41 and 27 to a point near the top of the column 25.

The contaminated hydrogen chloride enters expeller 32 through the pipe 24a as hereinbefore indicated, where impurities present in the hydrogen chloride react with chlorine which enters the expeller dissolved or entrained in the liquid from the chlorine separator 25. This liquid is delivered to the expeller through the pipe 30. As a result of the reaction of the chlorine, the impurities which might otherwise come in contact with the catalyst and act as poisons are transformed either into harmless substances which have no detrimental action on the catalyst or into substances which will be absorbed by the liquor and carried therewith downward and out of the expeller. The purified hydrogen chloride feed joins the gas evolved in the expeller and passes through the pipe 35 and cooler 36 to the pipes 37 and 6 and is eventually delivered, mixed with air or oxygen, to the reactor 5. Thus, none of the impurities initially present in the hydrogen chloride are permitted to reach the catalyst in a form in which they might have a detrimental effect thereon.

As hereinbefore indicated, water is formed by the initial reaction and if permitted to remain in the system would eventually dilute the products to a point where the method could no longer be maintained in operation. To eliminate this water, a part of the hydrogen chloride solution is withdrawn from the pipe 41 through a pipe 42 having a control valve 45 and is delivered to a dehydrator 43.

Entering the dehydrator 43, which consists of a tower having trays, rings or other means to increase the surface extension of the liquid, the liquid flows downwardly countercurrent to a stream of oxygen introduced through a pipe 46. Strong sulphuric acid is introduced through a pipe 47 at the top of the dehydrator. Contact between the sulphuric acid and hydrogen chloride solutions results in the removal of water from the hydrogen chloride, and the resulting gaseous hydrogen chloride with the oxygen supplied is delivered through a pipe 48, which is connected to the feed pipe 6, thus completing the cycle necessary to maintain the feed of hydrogen chloride and oxygen to the catalyst chamber.

The sulphuric acid escapes from the bottom of the dehydrator through a pipe 49 and is delivered through a pump 50 and pipe 51 to a heater 52 supplied with steam or other suitable heating agent. The heated sulphuric acid solution is then delivered through a pipe 53 to the top of concentrater 54 consisting of a tower with trays, rings or other means to extend the surface of the liquid. Air is introduced to the bottom of the concentrater 54 through a pipe 55 and passing up through the acid removes water vapor therefrom. The water vapor thus separated represents the water introduced by the reaction which is thus delivered from the system through a pipe 56. In addition to water produced in the system, surplus water introduced at any point, as for example reflux water that may be added through pipe 28 to prevent escape of any hydrogen chloride, may also be eliminated through the pipe 56. Any excess of sulphuric acid may be withdrawn through the valved pipe 57.

It will be understood that in feeding the hydrogen chloride and oxygen at various points in the system, the amounts supplied must be such that when all the feed is combined in pipe 6, the proportions of hydrogen chloride and oxygen will be those selected in order to maintain the reaction and limit the temperature in the catalyst chamber as hereinbefore specified. Consequently all of the feed must be regulated. This however is readily accomplished even though the materials entering the reaction are supplied at a variety of points, and some of the materials are thus recovered in the various steps described and returned for reuse in the cyclic operation. Various meters and other measuring devices (not shown) will be installed in the system at the necessary points to permit the control of the material supplied and thus maintain the balance of the operation.

Substantially none of the effective catalyst material is lost through volatilization, and consequently by reversing the direction of flow of the gaseous mixture from time to time as may be expedient, the catalyst body always remains in active condition and reaction proceeds with maximum efficiency to produce chlorine, which is the desired product. Owing to the provision for separating and recovering the hydrogen chloride, substantially none of the feed is lost, and the cost of the operation is correspondingly reduced.

The other essential element of the method is the separation of the excess water which is removed in the necessary proportions to prevent the otherwise unavoidable dilution of the liquids in the system. These several improvements insure the practical and commercial production of chlorine by the oxidation of hydrogen chloride.

In the event that the chief impurity in the hydrogen chloride is sulphur dioxide or other sulphur compound which, on reacting with the chlorine, forms sulphuric acid, and the amount formed is greater than the normal losses of sulphuric acid from the dehydrator system, the excess sulphuric acid formed is purged from the dehydrator system through the valved pipe 57 as hereinbefore indicated. The sulphuric acid may be used in producing more hydrogen chloride by reacting it with additional salt.

The chlorine reacting with the sulphur dioxide is converted to hydrogen chloride, and immediately becomes a part of the stream of the purified hydrogen chloride, and returns to the reactor to be reconverted to chlorine. This represents an important advantage since no loss of halogen results from this method of purification of the hydrogen chloride.

Oxygen or air may be fed into the system through either of the pipes 33 and 46 or through both, if desired. It is mixed with the hydrogen chloride now freed from harmful impurities or poisons in the pipe 6 and enters the reactor 5 through the pipes and valves hereinbefore described which permit reversal of the direction of flow of the entering gaseous mixture through the catalyst.

In case the quantity of chlorine normally entering the expeller 32 is insufficient to achieve the desired object it may be increased by increasing the rate at which the liquor is cycled through the expeller. In this manner, additional chlorine may be supplied for purifying the hydrogen chloride at little or no sacrifice in the efficiency of the scrubbing or for that matter in the thermal efficiency of the system.

In the event that the amount of chlorine normally entering the expeller 32 is in excess of the amount required for the purification of the hydrogen chloride feed, some of the feed may be introduced into the system through the alternative hydrogen chloride inlet 24b. In this case, the impurities entering with the hydrogen chloride through the inlet 24b will react with chlorine in the chlorine separator 25 and will thus consume some of the chlorine in the liquor leaving the chlorine separator. At the same time, the purified hydrogen chloride will dissolve in the liquor present in the lower section of the chlorine separator, thereby displacing or purging excess chlorine out of the liquor by maintaining in this lower section a higher partial pressure of hydrogen chloride and consequently a lower partial pressure of chlorine than would otherwise be the case. This again may be accomplished without any considerable sacrifice in the scrubbing or thermal efficiency of the system.

While the excess chlorine otherwise present in the hydrogen chloride evolved in the expeller 32 may not properly be considered a catalyst poison, nevertheless its presence in the gas entering the reactor is undesirable, since by mass action it tends to reduce the amount of new chlorine formed. Hence this method of freeing the recovered hydrogen chloride from chlorine is useful as an improved method of treatment of hydrogen chloride to be subsequently used in the production of chlorine. The efficiency of the method is increased because of the absence of chlorine in the gaseous mixture entering the reactor.

There are many processes involving the use of chlorine in which more or less of the chlorine entering the system finally appears as hydrogen chloride. This hydrogen chloride in many cases becomes a more or less useless by-product and oftentimes presents a problem of disposition. The present method may be employed to utilize economically the hydrogen chloride produced in this way.

In certain processes for the manufacture of pulp for paper, and especially kraft paper, two important materials are sodium sulphate and chlorine. The treatment of salt with sulphuric acid produces sodium sulphate and hydrogen chloride. The latter can readily be converted into chlorine by the present invention, thus providing a simple and economical method for the production of these two important raw materials without the simultaneous production of any undesirable by-products.

The term "oxygen" in the accompanying claims includes oxygen-containing gases.

Various changes may be made in the procedure and particularly in the apparatus employed in carrying out the method without departing from the invention or sacrificing its advantages.

I claim:

1. The method of producing chlorine by oxidation of hydrogen chloride which comprises delivering hydrogen chloride admixed with oxygen to a catalyst capable of promoting the oxidation of hydrogen chloride, washing the reaction product with dilute hydrochloric acid to separate unreacted hydrogen chloride and a small amount of chlorine therefrom, subjecting the washing liquid to counter-current contact with vapors produced by heating the liquid after such contact, introducing hydrogen chloride containing impurities reactive with chlorine below the level at which the washing liquid is introduced, for contact with the liquid and the vapors therefrom so that the chlorine in the washing liquid may react with impurities contained in the impure hydrogen chloride, condensing the moisture from the effluent hydrogen chloride, and utilizing the moisture-freed hydrogen chloride in the catalytic reaction with oxygen.

2. The method of producing chlorine by oxidation of hydrogen chloride which comprises delivering hydrogen chloride admixed with oxygen to a catalyst capable of promoting the oxidation of hydrogen chloride, washing the reaction product with dilute hydrochloric acid to separate unreacted hydrogen chloride and a small amount of chlorine therefrom, subjecting the washing liquid to counter-current contact with vapors produced by heating the liquid after such contact, introducing hydrogen chloride containing sulphur compounds below the level at which the washing liquid is introduced, for contact with the liquid and the vapors therefrom so that the chlorine in the washing liquor may react with the sulphur compounds contained in the hydrogen chloride, condensing the moisture from the effluent hydrogen chloride, utilizing the moisture-freed hydrogen chloride in the catalytic reaction with oxygen, recycling a portion of the dilute hydrochloric acid to wash the reaction product, withdrawing another portion of the dilute hydrochloric acid, subjecting said other portion of the dilute hydrochloric acid to the action of strong sulphuric acid to remove water and sulfuric acid formed by oxidation of sulphur compounds in the impure hydrogen chloride, withdrawing a portion of the sulphuric acid, concentrating the remainder of the sulphuric acid, and returning the concentrated sulphuric acid for contact with the dilute hydrochloric acid.

3. The method of producing chlorine by oxidation of hydrogen chloride which comprises delivering hydrogen chloride admixed with oxygen to a catalyst capable of promoting the oxidation of hydrogen chloride, washing the reaction product with dilute hydrochloric acid to separate unreacted hydrogen chloride and a small amount of chlorine therefrom, subjecting the washing liquid to counter-current contact with vapors produced by heating the liquid after such contact, introducing hydrogen chloride containing sulphur compounds below the level at which the washing liquid is introduced, for contact with the liquid and the vapors therefrom so that the chlorine in the washing liquid may react with the sulphur compounds contained in the hydrogen chloride, condensing the moisture from the effluent hydrogen chloride and utilizing the moisture-freed hydrogen chloride in the catalytic reaction with oxygen, recycling a portion of the dilute hydrochloric acid to wash the reaction product, withdrawing another portion of the dilute hydrochloric acid, subjecting said other portion of the dilute hydrochloric acid to the action of strong sulphuric acid to remove water and sulphuric acid formed by oxidation of sulphur compounds in the impure hydrogen chloride and to separate vapors of hydrogen chloride, utilizing such hydrogen chloride with oxygen in the catalytic reaction, withdrawing a portion of the sulphuric acid, concentrating the remainder of the sulphuric acid, and returning the concentrated sulphuric acid for contact with the dilute hydrochloric acid.

4. The method of producing chlorine by oxidation of hydrogen chloride which comprises delivering hydrogen chloride admixed with oxygen to a catalyst capable of promoting the oxidation of hydrogen chloride, washing the reaction products with dilute hydrochloric acid to separate unreacted hydrogen chloride and a small amount of chlorine therefrom, feeding gaseous hydrogen chloride containing impurities reactive with chlorine to the system, subjecting the washing liquid to countercurrent contact the gaseous hydrogen chloride fed to the system at a level below that at which the washing liquid is introduced for contact with the gaseous hydrogen chloride so that the chlorine in the washing liquid may react with impurities contained in the impure hydrogen chloride, then subjecting the washing liquid to further countercurrent contact with vapors produced by heating the liquid after such contact, whereby a portion of said separated, unreacted hydrogen chloride is liberated from the liquid, and returning said liberated hydrogen chloride to the reaction zone together with the gaseous hydrogen chloride fed to the system for use in the catalytic reaction with oxygen.

FREDERICK R. BALCAR.